United States Patent
Luethi et al.

[15] 3,683,020
[45] Aug. 8, 1972

[54] BIS-OXALIC ACID DIAMIDES FOR USE AS STABILIZERS

[72] Inventors: Christian Luethi, Muenchenstein; Hans-Rudolf Biland, Gelterkinden; Max Duennenberger, Frenkendorf, all of Switzerland

[73] Assignee: Ciba-Geigy AG

[22] Filed: April 2, 1968

[21] Appl. No.: 718,244

[30] Foreign Application Priority Data

April 11, 1967 Switzerland...............5132/67

[52] U.S. Cl. ......260/558 R, 260/32.6 R, 260/32.6 A, 260/32.6 N, 260/32.6 PQ, 260/45.9 R, 260/45.9 P, 260/112 R, 260/214, 260/231 R, 260/232, 260/247.2 A, 260/471 R, 260/507 R, 260/516, 260/518 R, 260/558 S, 260/559 A, 260/802, 260/803, 260/857 R, 260/864, 260/874, 424/59, 424/60, 424/126, 252/402, 252/403, 8/73, 96/109, 117/138.5

[51] Int. Cl...........................................C07c 103/38
[58] Field of Search.........260/558, 559, 247.1, 247.2

[56] References Cited

UNITED STATES PATENTS 3,256,284  6/1966  Rio............................260/559

FOREIGN PATENTS OR APPLICATIONS 1,338,399  8/1963  France.....................260/559
1,371,391  7/1964  France.....................260/559

*Primary Examiner*—Henry R. Jiles
*Assistant Examiner*—Harry I. Moatz
*Attorney*—Harry Goldsmith, Joseph G. Kolodny, Bryant W. Brennan and Edward J. Sites

[57] ABSTRACT

The present invention relates to certain novel bis-oxalic acid diamide derivatives which are especially useful as ultraviolet absorbers for organic materials. Said new bis-oxalic acid diamides correspond to the formula

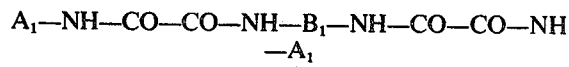

$A_1$—NH—CO—CO—NH—$B_1$—NH—CO—CO—NH—$A_1$ wherein $A_1$ each represents an alkyl, alkenyl, cycloalkyl, aralkyl, aryl or amino group, with these groups optionally containing further substituents, and $B_1$ represents an alkylene or arylene grouping which is free of ethylene double bonds and may be interrupted by hetero-atoms, wherein the groups $A_1$ and $B_1$ must not displace the absorption maximum of these compounds to above 370m$\mu$, and wherein at least one of the groups $A_1$ and $B_1$ must contain a benzene ring which is directly bonded to a —NH— group according to the above formula.

12 Claims, No Drawings

BIS-OXALIC ACID DIAMIDES FOR USE AS STABILIZERS

The present invention relates to new bis-oxalic acid diamides, processes for their manufacture, and their use for stabilizing organic materials, especially to the influence of ultraviolet radiation.

The new bis-oxalic acid diamides correspond to the general formula (1) $A_1$—NH—CO—CO—NH—$B_1$—NH—CO—CO—NH—$A_1'$ wherein $A_1$ and $A_1'$ represent identical or different alkyl, alkenyl, cycloalkyl, aralkyl or aryl groups or amino groups, which may optionally contain further substituents, wherein $B_1$ furthermore represents an alkylene or arylene grouping which is free of ethylene double bonds and is optionally interrupted by hetero-atoms, wherein the groups $A_1$, $A_1'$ and $B_1$ do not displace the absorption maximum of these compounds to above 370 m$\mu$, and wherein at least one of the groups $A_1$, $A_1'$ and $B_1$ must contain a benzene ring which is directly bonded to a —NH— group in accordance with the above formula.

The last-mentioned condition in the above formulation means that the structural element

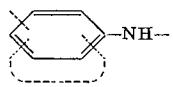

must be present at least once, either as a bivalent intermediate unit or as a monovalent terminal unit, and that the benzene ring may also be connected to other ring systems, such as for example of naphthalene or tetrahydronaphthalene.

For reasons of simpler preparative accessibility, the group of compounds, form amongst the compounds according to formula (1), which is mostly of greater practical interest is that where the compounds contain identical residues $A_1$ and $A_1'$, that is to say compounds of formula (2) $A_1$—NH—CO—CO—NH—$B_1$—NH—CO—CO—NH—$A_1$, wherein $A_1$ each represents an alkyl, alkenyl, cycloalkyl, aralkyl or aryl group or an amino group, with these groups optionally containing further substituents, and $B_1$ represents an alkylene or arylene grouping which is free of ethylene double bonds and is optionally interrupted by hetero-atoms, wherein the groups $A_1$ and $B_1$ must not displace the absorption maximum of these compounds to values lying above 370 m$\mu$, and wherein at least one of the groups $A_1$ and $B_1$ must contain a benzene ring which is directly bonded to a —NH— group according to the above formula. By an amino group which is optionally further substituted there is preferably to be understood, for $A_1$, an alkyl ($C_1$—$C_{12}$)amino, hydrazino or phenylhydrazino group.

Within the framework of the above definitions, preferred interest attaches to bis-oxalic acid diamides of formula (3) $A_2$—NH—CO—CO—NH—$B_2$—NH—CO—CO—NH—$A_2$, wherein $A_2$ each represents a phenyl group, a phenyl group having one to two alkyl groups with one to six carbon atoms or alkoxy groups with one to eight carbon atoms as substituents, an alkenyl group having one to four carbon atoms, an alkyl group having one to 18 carbon atoms, an alkylaminoalkyl group or a hydroxyalkyl group each having up to eight carbon atoms, a morpholino-alkyl (1–4 C) group, a phenyl-alkyl (1–4 C) group or an amino group, and $B_2$ represents (a) an alkylene group having one to 12 carbon atoms, (b) an alkylene group having one to 12 carbon atoms which may be interrupted by —NH— groups or —N(alkyl)— groups having one to four carbon atoms in the alkyl part, or (c) a phenylene residue which may contain halogen atoms, alkyl or alkoxy groups having one to four carbon atoms each, (d) a naphthylene residue, (e) a diphenylene residue which may carry alkyl or alkoxy groups containing one to four carbon atoms, or (f) a residue (3a)

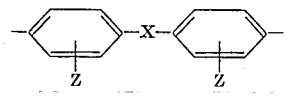

wherein Z denotes hydrogen or an alkyl group containing one to four carbon atoms and X represents an alkylene group containing one to four carbon atoms or a bridge member —O—, —S—, —NH— or —SO$_2$—, and wherein the groups $A_2$ and $B_2$ must not displace the absorption maximum of these compounds to values above 370 m$\mu$, and wherein furthermore at least one of the groups $A_2$ and $B_2$ must contain a benzene ring which is directly bonded to a —NH— group according to the above formula.

Important types of compounds according to the above definition may be circumscribed as follows:

I. Bix-oxalic acid diamides of formula (4) $D_1$—NH—CO—CO—NH—$E_1$—NH—CO—CO—NH—$D_1$, wherein $D_1$ denotes a residue containing one to two benzene nuclei with one benzene nucleus bonded to the NH— group of the above formula, and which may in turn be substituted (a) by alkyl groups, alkenyl groups, cyclohexyl groups or araliphatic groups or their substitutive derivatives having up to 18 carbon atoms, (b) by hydroxyl groups, amino groups, carboxyl groups, sulphonic acid groups or their functional derivatives, or (c) by other, non-chromophoric, substituents, and $E_1$ denotes a phenylene residue, diphenylene residue, naphthylene residue or a residue

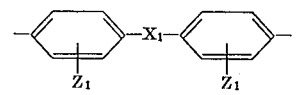

wherein the phenylene groups of these residues each may carry a substituent $Z_1$ having the significance of an alkyl or alkoxy group containing one to four carbon atoms, a halogen atom or an SO$_3$H group, and $X_1$ represents an alkylene group containing one to four carbon atoms or a bridge member —O—, —S—, —N— or —SO$_2$— (the third valency of the above nitrogen bridge normally being occupied either by hydrogen or by an alkyl group having one to four carbon atoms).

II. Bis-oxalic acid diamides of formula (5) D$_1$—NH—CO—CO—NH—U$_1$—NH—CO—CO—NH—D$_1$, wherein D$_1$ denotes a residue containing one to two benzene nuclei and bonded by a benzene nucleus to the NH- group of the above formula, this residue in turn being possibly substituted (a) by alkyl groups, alkenyl groups, cyclohexyl groups or araliphatic groups or their substituted derivatives having up to 18 carbon atoms, (b) by hydroxyl groups, amino groups, carboxyl groups, sulphonic acid groups or their functional derivatives, or (c) by other non-chromophoric substituents, and U$_1$ represents an alkylene residue containing one to 18 carbon atoms, whose carbon chain may be interrupted once or several times by nitrogen, oxygen or sulphur bridges.

III. Bis-oxalic acid diamides of formula (6) D$_2$—NH—CO—CO—NH—U$_2$—NH—CO—CO—NH—D$_2$, wherein D$_2$ each denotes a phenyl group or a phenyl group having one to two alkyl groups with one to six carbon atoms or alkoxy groups with one to eight carbon atoms as substituents, and U$_2$ represents an alkylene group having one to 12 carbon atoms or an alkylene group with one to 12 carbon atoms which may be interrupted by —NH— groups or —N(alkyl)— groups having one to four carbon atoms in the alkyl part.

IV. Bis-oxalic acid diamides of formula (7) V$_1$—NH—CO—CO—NH—E$_1$—NH—CO—CO—NH—V$_1$, wherein E$_1$ denotes a phenylene residue, diphenylene residue, naphthylene residue or a residue

wherein the phenylene groups of these residues each may carry a substituent Z$_1$ having the significance of an alkyl or alkoxy group containing one to four carbon atoms, a halogen atom or an SO$_3$H group, and X$_1$ represents an alkylene group containing one to four carbon atoms or a bridge member —O—, —S—, —N— or —SO$_2$—, and V$_1$ represents an alkyl group, alkenyl group, cycloalkyl group or aralkyl group having up to 18 carbon atoms or a substitutive derivative of such a group.

V. Bis-oxalic acid diamides of formula (8) V$_2$—NH—CO—CO—NH—E$_2$—NH—CO—CO—NH—V$_2$ wherein E$_2$ represents (a) a phenylene residue which may contain halogen atoms, alkyl or alkoxy groups having one to four carbon atoms each, (b) a naphthylene residue (c) a diphenylene residue which may carry alkyl or alkoxy groups containing one to four carbon atoms, or (d) a residue

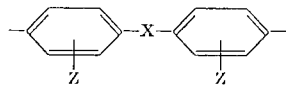

wherein Z denotes hydrogen or an alkyl group containing one to four carbon atoms and X represents an alkylene group containing 1 to 4 carbon atoms or a bridge member —O—, —S—, —NH— or —SO$_2$—, and V$_2$ represents an alkenyl group having 1 to 4 carbon atoms, an alkyl group having one to 18 carbon atoms, an alkylamino-alkyl group or a hydroxyalkyl group each having up to eight carbon atoms, a morpholinoalkyl(1–4 C)—group, a phenyl-alkyl (1–4 C)—group or an amino group.

Within the framework of the above definitions (especially those of formulas 4, 5 and 7) substitutive derivatives of alkyl, alkenyl, cyclohexyl or araliphatic groups are to be understood as groups such as for example hydroxyalkyl, alkoxyalkyl, halogenalkyl, carboxyalkyl, carbalkoxyalkyl, cyanalkyl, sulphonylalkyl, aminoalkyl or alkenyl, cyclohexyl or araliphatic groups with analogous substituents. Aralkyl groups mostly represent phenylalkyl groups with one to four carbon atoms in the alkyl part.

By functional derivatives of hydroxyl and amino groups there are above all to be understood the alkoxy, alkenyloxy, phenoxy, aromatic and aliphatic acyl compounds, as well as the analogous cases for amino groups (alkylamino, arylamino and acylamino residues). Functional derivatives of carboxyl and sulphonic acid groups are above all their aliphatic and aromatic esters and amides (or substituted amides) (the salts are to be included with the acids themselves). As "further non-chromophoric substituents" there may for example be mentioned the nitrile group and halogen atoms.

Specific interesting types of compounds, mostly for special end uses, are represented by those corresponding to the following formulas:

a. Compounds of formula (9)

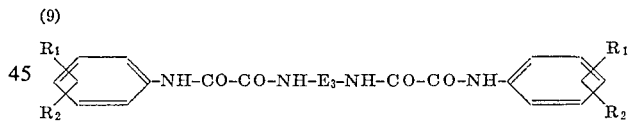

wherein E$_3$ represents a group

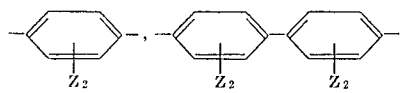

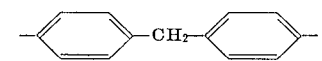

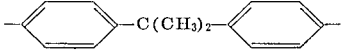

or

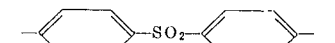

with Z$_2$ having the significance of hydrogen, methyl or methoxy, and R$_1$ and R$_2$ denote a hydrogen atom, an alkoxy group containing one to 18 carbon atoms or an alkyl group containing one to 18 carbon atoms.

b. Compounds of formula

(10) 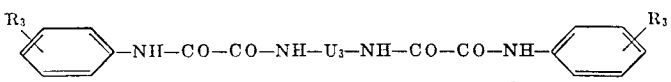

wherein $U_3$ represents an alkyl group containing one to 12 carbon atoms which may be interrupted by $-NQ_1-$ bridges, wherein $Q_1$ represents hydrogen or an alkyl group containing one to four carbon atoms and $R_3$ denotes a hydrogen atom, an alkoxy group containing one to 18 carbon atoms or an alkyl group containing one to 12 carbon atoms.

c. Compounds of formula

(11) 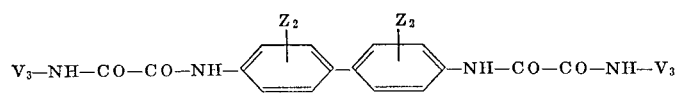

wherein $Z_2$ denotes a hydrogen atom, a methyl group or a methoxy group and $V_3$ denotes an alkyl group containing one to 18 carbon atoms, an alkenyl group containing up to four carbon atoms, an aralkyl group containing a benzene residue and an alkyl part containing one to four carbon atoms, a hydroxyalkyl group containing one to eight carbon atoms or an aminoalkyl group containing one to 18 carbon atoms, whose amino group may be alkylated or may represent a morpholinio residue.

d. Compounds of formula

(12) $F_1-NH-CO-CO-NH-E_1-NH-CO-CO-NH-F_1$ wherein $E_1$ has the significance given above and $F_1$ represents an amino group or a phenylamino group.

By way of example there may be listed the following compounds corresponding to the above general formulas which may be obtained according to the manufacturing processes given below.

Examples of the type of formula (4): p-phenylene-bis-(2'-ethoxy-5'-tert.butyl-oxanilide), m-phenylene-bis-(2',4'-diethoxy-oxanilide), (2,5-dimethoxy-1,4-phenylene)-bis-(oxanilide), (2,5-dichloro)-1,4-phenylene-bis-(2'-oxalylnaphthylamide), (2,5-dimethyl-1,4-phenylene)-bis-(4'-acetoxyoxanilide), (6-methyl-1,3-phenylene)-bis-(2'-allyloxy-4'-isononyl-oxanilide), 1,5-naphthylene-bis-(4'-methyl-oxanilide), p,p'-biphenylene-bis-(2''-dodecyloxy-oxanilide), (3,3'-dimethoxy-4,4'-biphenylene)-bis-(4''-cyano-oxanilide), (3,3'-dimethoxy-4,4'-biphenylene)-bis-(2''-octadecyloxy-oxanilide), 4,4'-bis-(2''-butoxy-oxanilide)-diphenylmethane, 4,4'-bis-(4''-chlor-oxanilide)-diphenylsulphide, 4,4'-bis-(4''-butyloxanilide)-diphenylsulphone, 4,4'-bis-(4''-dodecyloxyoxanilide)-diphenyl ether.

Examples of the type of formula (5): 1,8-octylene-bis-(2'-butoxy-4'-isononyl-oxanilide), 1,18-octadecylene-bis-(2'-octoxy-oxanilide), 1,3-propylene-bis-(4'-dodecyloxyoxanilide), 3,3'-dipropylamine-bis-(1''-oxalylnaphthylamide), 2,2'-diethylsulphide-bis-(2''-lauroyloxy-5''-tert.butyloxanilide), 4,4'-dibutyl ether-bis-(2''-methoxy-oxanilide).

Examples of the type of formula (7): p-phenylene-bis-(methyloxamide), p-phenylene-bis-(octyloxamide), p-phenylene-bis-(octadecyloxamide), p-phenylene-bis-($\beta$-hydroxyethyl-oxamide), p-phenylene-bis-($\gamma$-morpholinopropyloxamide), m-phenylene-bis-(ethyloxamide), m-phenylene-bis-(methallyl-oxamide), m-phenylene-bis-(cyclohexyloxamide),(2,5-dimethoxy-1,4-phenylene)-bis-(butyloxamide), (2,5-dichloro-1,4-phenylene)-bis-($\beta$-ethoxyethyloximide), (2,5-dimethyl-1,4-phenylene)-bis-(2'-ethyl-hexyloamide), (6-methyl-1,3-phenylene)-bis-(octyloxamide), 1,5-naphthylene-bis-(ethyloxamide), 1,5-naphthylene-bis-(aminooxamide), p,p'-biphenylene-bis-(phenylamino-oxamide), p,p'-biphenylene-bis-(methyloxamide), p,p'-biphenylene-bis-(octyloxamide), p,p'-biphenylene-bis-(dimethylaminopropyloxamide), (3,3'-dimethoxy-4,4'-biphenylene)-bis-(methyloxamide), (3,3'-dimethoxy-4,4'-biphenylene)-bis-(dodecyloxamide), (3,3'-dimethoxy-4,4'-biphenylene)-bis-($\gamma$-morpholinooxamide), (3,3'-dimethyl-4,4'-biphenylene)-bis-($\beta$-ethoxyethyloxamide), 4,4'-bis-(methyloxamide)-diphenylmethane, 3,3'-bis-(octyloxamide)-4,4'-dimethyl-diphenylmethane, 4,4'-bis-($\beta$-ethoxyethyloxamide)-diphenyl-dimethylmethane, p,p'-biphenylene-bis-($\gamma$-dimethylaminopropyloxamide).

The compounds characterized above may be manufactured analogously to processes which are in themselves known. For the compounds of formula (2) which are of symmetrical structure as regards the residues $A_1$ and are of practical importance, the most important method of manufacture consists of either reacting 1 mol of a compound of formula

(13) $Y-OC-OC-NH-B_1-NH-CO-CO-Y$ with 2 mols of an amine $A_1-NH_2$, or reacting 1 mol of an amine

(14) $H_2N-B_1-NH_2$ with 2 mols of a compound of formula $A_1-NH-CO-COY$, wherein $A_1$ and $B_1$ have the significance given above and Y represents $-OH$, $-Cl$ or $-OAlk$, with Alk having the significance of a lower alkyl group (containing one to four carbon atoms). In the case where Y denotes a hydroxyl group or a group $-OAlk$, the condensation is carried out at temperatures between 120° and 200°C in the presence of a solvent boiling above 120°C, or in the melt and in the presence of not more than 0.1 mol of boric acid.

The choice of the manufacturing process variant which is most advantageous in each particular case within the framework of the general principle given above is determined on the one hand by the accessibility of the starting materials and on the other hand by the reactivity of the functional groups which are to be reacted. As regards the latter aspect it must be borne in mind that the reaction of an acid chloride group with an amino group, regardless of which of the positions indicated in the above formulas they occupy, in general takes place easily (that is to say low reaction temperatures, say 0° to 150°C, suffice and catalysts can in most cases also be dispensed with). The reactions of a carboxyl group or carboxylic acid alkyl ester group (regardless at which of the positions indicated above as being possible) with an alkylamine of the type $V_1$—$NH_2$ (see below) or an alkylene diamine of the type $NH_2$—$U_1$—$NH_2$ (see below) takes place comparably easily. Preferred possible temperatures for this type of reaction are between 40° and 120°C, and it is appropriate to carry out the condensation at the reflux temperature of the reaction mixture. Additives which bond hydrochloric acid are mostly not necessary; equally, azeotropic removal of the alcohol produced in one of the types of reaction can be dispensed with.

The reactions of the carboxyl group or of the carboxylic acid alkyl ester group with arylamines of the type $D_1$—$NH_2$ (see below) or arylenediamines of the type $NH_2$—$E_1$—$NH_2$ (also see below) prove to be more sluggish and therefore to require higher reaction temperatures (120° to 220°C), and are frequently also appropriately carried out in the presence of condensation catalysts such as for example boric acid.

For these, it is appropriate to work in the melt or in high boiling solvents (boiling point > 150°C) such as for example dichlorobenzene and in the presence of a condensation catalyst, for example catalyst quantities of boric acid (about 0.1 mol or less), and to remove the water or alcohol formed during the reaction (azeotropically). The reaction temperatures are herein preferably between 150° and 200°C.

The following routes may be particularly picked out from the multiplicity of fundamentally possible variants according to the above general reaction scheme, taking into account the above information and the practical significance of the end products:

There are two advantageous routes for the manufacture of bis-oxalic acid diamide derivatives according to formula (3), of which the first consists in carrying out the condensation of 1 mol of a compound of formula

(15) $Y_1$—CO—CO—NH—$E_1$—NH—CO—CO—$Y_1$ with 2 mols of an amine

(16) $D_1$—$NH_2$ at temperatures between 120° and 220°C, optionally in the presence of a solvent and a condensation catalyst, with $D_1$ and $E_1$ having the significance given above and $Y_1$ representing —OH or —OAlk, with Alk having the significance of a lower alkyl group.

According to the other advantageous method of manufacture the procedure is to effect the condensation of 1 mol of a compound of formula

(17) $NH_2$—$E_1$—$NH_2$ with 2 mols of a compound of formula

(18) $D_1$—NH—CO—CO—$Y_1$ at temperatures between 120° and 220°C, optionally in the presence of a solvent and a condensation catalyst, with $D_1$ and $E_1$ having the significance given above and $Y_1$ representing —OH or —OAlk, with Alk having the significance of a lower alkyl group.

When manufacturing compounds as defined under formula (5) it is appropriate to proceed by effecting the condensation of 1 mol of a diamine

(19) $NH_2$—$U_1$—$NH_2$ with 2 mols of an oxalic acid half-amide of formula

(20) $D_1$—NH—CO—CO—Y at temperatures of between 0° and 150°C, optionally in the presence of a solvent, with $U_1$ and $D_1$ having the significance given above and Y representing —OH, —Cl or —OAlk, and Alk representing a lower alkyl group.

Compounds according to formula (7) may advantageously be obtained by condensing 1 mol of a compound of formula

(21) Y—CO—CO—NH—$E_1$—NH—CO—CO—Y with 2 mols of an amine of formula

(22) $V_1$—$NH_2$ at temperatures of between 0° and 150°C, optionally in the presence of a solvent, with $E_1$ and $V_1$ having the significance given above and Y representing —OH, —Cl or —OAlk, and Alk denoting a lower alkyl group.

Free hydroxyl groups in the compounds obtained according to the above processes may subsequently be etherified or esterified according to methods which are in themselves known.

Suitable solvents are for example aromatic hydrocarbons or aromatic halogenated hydrocarbons such as benzene, toluene and chlorobenzene, and furthermore also above all those having a boiling point above about 140°C, such as say dichlorobenzene and trichlorobenzene or p-cymene, alcohols or their ethers such as ethanol, ethylene glycol, diethylene glycol, triethylene glycol, glycerine, diethylene glycol diethyl ether or cyclic ethers such as dioxane.

By means of the compounds described above under formula (1) and the subsequent formulas it is in principle possible to stabilize and protect all those organic materials which are in some way damaged or destroyed by the influence of ultraviolet radiation. Such damage as a result of the influence of the same cause, namely ultraviolet radiation, may have very diverse effects, for example a change of color, change in the mechanical properties (brittleness, crazing, tear strength, flexural strength, abrasion resistance, elasticity or ageing), initiation of undesired chemical reactions (decomposition of sensitive chemical substances, for example medicines, photochemically induced rearrangements, oxidation and the like (for example of oils containing unsaturated fatty acids)), initiation of burn phenomena and irritations (for example in the case of human skin) and many others. Preferential importance attaches to the use of the bis-oxalic acid diamides defined above for protecting polycondensation products and polyaddition products against ultraviolet action. Furthermore a whole series of the compounds defined above, in addition to the ultraviolet protective action mentioned, also exhibit a stabilizing effect towards the action of oxygen and heat, as well as antistatic properties.

The organic materials to be protected may be in the most diverse processing states and aggregate states, whilst their common characteristic consists of a sensitivity towards ultraviolet radiation.

As low molecular or higher molecular substances which are possible substances for protection or stabilization by the process according to the invention there may for example be mentioned, without restricting the invention thereto: organic natural substances such as are used for pharmaceutical purposes (medicines), dyestuffs which are sensitive to ultraviolet light, compounds which are foodstuffs or are present in foodstuffs and are decomposed by exposure to light (unsaturated fatty acids in oils) and the like.

As high molecular organic substances there may for example be mentioned:

I. Synthetic organic high molecular materials such as: (a) polymerization products based on organic compounds containing at least one polymerizable carbon-carbon double bond, that is to say their homopolymers or copolymers as well as their post-treatment products such as for example cross-linking, grafting or degradation products, polymer dilutions, modified products obtained by conversion of reactive groups in the polymer molecule and the like, such as for example polymers based on $\alpha,\beta$-unsaturated carboxylic acids (for example acrylates, acrylamides or acrylonitrile), of olefine hydrocarbons such as for example $\alpha$-olefines, ethylene, propylene or dienes, that is to say also rubbers and rubber-like polymers (also so-called ABS-polymers), polymers based on vinyl and vinylidene compounds (for example styrene, vinyl esters, vinyl chloride or vinyl alcohol), of halogenated hydrocarbons, of unsaturated aldehydes and ketones, allyl compounds and the like; (b) other polymerization products, such as for example products obtainable by ring opening, for example polyamides of the polycaprolactam type, and also formaldehyde polymers or polymers which are obtainable both by polyaddition and also by polycondensation such as polyethers, polythioethers, polyacetals or thioplastics.

(c) Polycondensation products or pre-condensates based on bifunctional or polyfunctional compounds having groups capable of condensation, their homocondensation and cocondensation products as well as products resulting from posttreatment, of which there may be mentioned by way of example: polyesters [saturated (for example polyethylene terephthalate) or unsaturated (for example maleic acid-dialcohol polycondensates as well as their cross-linking products with copolymerizable vinyl monomers), unbranched as well as branched (also based on polyhydric alcohols, such as for example alkyd resins)], polyamides (for example hexamethylene diamine adipate), maleate resins, melamine resins, phenolic resins (for example novolacs), aniline resins, furane resins, carbamide resins and also their pre-condensates and products of analogous structure, polycarbonates, silicone resins and others.

(d) Polyaddition products such as polyurethanes (cross-linked or uncross-linked) and epoxide resins.

II. Semi-synthetic organic materials such as for example cellulose esters or mixed esters (acetate or propionate), nitrocellulose, cellulose ethers, regenerated cellulose (viscose or cuprammonium cellulose) or their post-treatment products, and casein plastics.

III. Natural organic materials of animal or vegetable origin, for example based on cellulose or proteins such as wool, cotton, silk, raffia, jute, hemp, furs and hair, leather, finely divided wood materials, natural resins (such as colophony, especially lacquer resins), gelatines, glues, and also rubber, guttapercha, balata, as well as their post-treatment and modification products, degradation products, and products obtainable by conversion of reactive groups.

The possible organic materials, especially plastics of the class of vinyl chloride polymers, saturated and unsaturated polyesters, celluloses and polyamides, may be present in the most diverse processing states (raw materials, semi-finished goods or finished goods) and aggregate states. They may on the one hand be present in the form of the most diverse shaped structures, that is to say for example predominantly three-dimensional articles such as profiles, containers or the most diverse machined articles, chips or granules, or foams; predominantly two-dimensional articles such as films, foils, lacquers, impregnations and coatings or predominantly one-dimensional articles such as filaments, fibers flocks, bristles and wires. The materials mentioned may on the other hand also be present in unshaped states, in the most diverse homogeneous and inhomogeneous forms of division and states of aggregation, for example as powders, solutions, normal or inverted emulsions (creams), dispersions, latices, sols, gels, putties, waxes, adhesives and filling compositions.

Fiber materials may be present in the most diverse predominantly non-textile processing forms, for example as filaments, yarns, fiber fleeces, felts, waddings, flocked structures or as textile woven fabrics or textile laminates, knitted fabrics, paper, cardboard and the like.

The new stabilizers may for example also be employed as follows: (a) In cosmetic preparations such as perfumes, colored and non-colored soaps and bath additives, skin creams and face creams, powders, repellants and especially sun oils and creams; (b) mixed with dyestuffs or pigments or as an additive to dye baths, printing pastes, etching pastes or reserve pastes, and furthermore also for the post-treatment of dyeings, prints or discharge prints; (c) mixed with so-called "-carriers," antioxidants, other light protection agents, heat stabilizers or chemical bleaching agents; (d) mixed with cross-linking agents, finishing agents such as starch or synthetically accessible finishes; (e) combined with detergents. The detergents as stabilizers may also be separately added to the wash baths which are to be used; (f) in gelatine layers for photographic purposes; (g) in combination with polymeric carriers (polymerization, polycondensation or polyaddition products) in which the stabilizers are contained, optionally in addition to other substances, in a dissolved or dispersed form, for example in the case of coating or impregnating agents or binders (solutions, dispersions or emulsions) for textiles, fleeces, paper and leather; (h) as additives to the most diverse industrial products in order to reduce their speed of ageing, for example as an additive to glues, adhesives, paints and the like.

To the extent that the protection agents to be used according to the invention are to be used for the treatment of textile organic materials of natural or synthetic origin, for example textile woven fabrics, they may be applied to the substrate which is to be protected at any stage of the final processing, such as finishing, crease-proofing, dyeing processes, and other finishing by fixing processes resembling dyeing processes.

The new stabilizers to be used in accordance with the invention are preferably added or incorporated into the materials before or during their shaping. Thus for example when manufacturing films, foils, strips or shaped articles they may be added to the compression moulding composition or injection moulding composition, or they may be dissolved, dispersed or otherwise finely distributed in the spinning composition before spinning. The protective agents may also be added to the starting substances, reaction mixtures or intermediates for the manufacture of fully synthetic or semi-synthetic organic materials, that is to say also before or during the chemical reaction, for example in the case of a polycondensation (that is to say also to pre-condensates), a polymerization (that is to say also to pre-polymers) or a polyaddition.

An important variant, in respect of use technology, for the stabilizing agents to be used in accordance with the invention is to incorporate these substances into a protective layer which protects the material behind it. This can be done in the form of applying the ultraviolet absorption agents onto the surface layer (of a film, a fiber, or a multidimensional shaped article). This is for example achievable by a kind of dyeing process, or the active substance may be embedded in a polymer (polycondensate or polyadduct) film by surface coating methods which are in themselves known, using polymeric substances, or the active substance can be allowed to diffuse or swell into the surface layer in a dissolved form by means of a suitable solvent. A further important variant consists of the ultraviolet absorption agent being embedded in a self-supporting essentially two-dimensional carrier material, for example a film or the wall of a container, in order thereby to keep ultraviolet radiation away from the substance lying behind it (examples: display windows, films, transparent packaging, and bottles).

It is obvious from the foregoing that in addition to the protection of the substrate or carrier substance which contains the ultraviolet absorption agent, the protection of other concomitant substances of the substrate is simultaneously also achieved, for example of dyestuffs, anti-oxidants, disinfectant additives, anti-static agents and other finishes, plasticizers and fillers.

Depending on the nature of the substance to be protected or stabilized, on its sensitivity or the form of protection and stabilization from the point of view of use technology, the requisite quantity of stabilizer may vary within wide limits, for example between about 0.01 and 10 percent by weight relative to the amount of substrate to be protected. For most practical purposes quantities of about 0.05 to 2 percent however suffice.

The process for the protection of organic materials against the action of ultraviolet radiation and heat which follows from the foregoing thus consists of homogeneously distributing the compounds defined above in the organic materials to be protected, applying them to the surface of these materials, or coating the materials to be protected with a filter layer which contains the compounds described.

In particular it is appropriate to proceed by incorporating the compounds described above, in bulk, or in a dissolved or dispersed form, in the organic materials to be protected in amounts of 0.1 to 10, preferably 0.2 to 2.0, percent by weight relative to the quantity of the materials to be protected, in a homogeneously distributed form before final shaping.

If the substance to be used in accordance with the invention is to be applied to the surface of the substrate to be protected, such as for example a fiber material (woven fabric), then this can advantageously be effected by introducing the substrate to be protected into a bath which contains the ultraviolet absorption agent in a dissolved or dispersed form. Suitable solvents may for example be methanol, ethanol, acetone, ethyl acetate, methyl ethyl ketone, cyclohexanol or especially water. The substrate to be treated is, similarly to the case of dyeing processes, left in the bath for a certain period—10 minutes to 24 hours suffice in most cases—at 10 to 120°C, during which time the bath may optionally be agitated. Thereafter the material is rinsed, optionally washed and dried.

It is frequently appropriate to employ the abovementioned light protection agents in combination with sterically hindered phenols, esters of thiodipropionic acid or organic phosphorus compounds.

Admittedly oxalic acid-bis-oxyarylamides have already been recommended as protective agents against ultraviolet radiation, but at that time it was believed that the light stability of such compounds was tied to the presence of free hydroxyl groups in the ortho-position to the bonds to the amide nitrogen atoms. In contrast to this belief it has now been found that special asymmetric oxalic acid diarylamides which lack the characteristic mentioned not only prove to be technically excellently usable ultraviolet absorption agents but surprisingly also show higher light stabilities.

The parts mentioned in the following examples always represent parts by weight unless otherwise stated.

EXAMPLE 1

9.7 parts of the compound of formula $C_6H_5$—NH—CO—COOC$_2$H$_5$ are dissolved in 60 parts of toluene at 50°C. 3.6 parts of N,N-bis-(3-aminopropyl)-methylamine in 20 parts of toluene are added dropwise with stirring at 50°C over the course of 30 minutes. The mixture is thereafter stirred for 2 hours at each of 50°, 70° and 90°C. The ice-cooled reaction mixture is suction-filtered and washed with 30 parts of alcohol. Yield, 9.2 parts of the compound

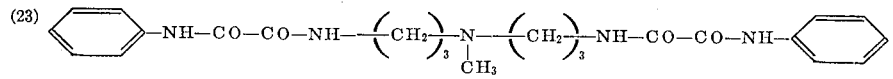

(23)

Melting point 180° to 181°C.
Analysis: $C_{23}H_{29}O_4N_5$
Calculated: C 62.85 H 6.65 N 15.94
Found: C 62.96 H 6.56 N 16.07

EXAMPLE 2

9.7 parts of the compound of formula $C_6H_5$—NH—COCOOC$_2$H$_5$ and 5 parts of 4,4'-diaminodiphenyl-methane are fused with 0.3 parts of boric acid at 130°C in an apparatus with a descending condenser, the temperature is raised to 170°C over the course of 1 hour and the resulting alcohol is thereafter distilled off for 2 hours at 170°C and 2 hours at 180°C. Yield: 9 parts of the compound (from dimethylformamide)

(24)

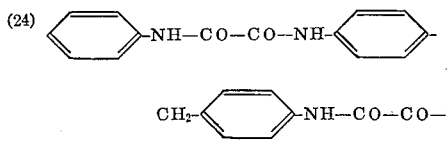

Melting point: > 320°C.
Analysis: $C_{29}H_{24}O_4N_4$
  Calculated: C 70.72 H 4.91 N 11.38
  Found: C 70.52 H 4.91 N 11.39

EXAMPLE 3

8.9 parts of the compound of formula (25)

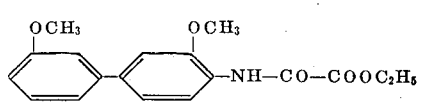

$C_2H_5OOC-CO-NH-$ are dissolved in 100 parts of boiling dioxane and 5.2 parts of octylamine are added. The reaction mixture is stirred for 21 hours at the boiling point of the dioxane. Thereafter the reaction solution is cooled to room temperature and water is added to it. The precipitated product is suction-filtered and dried. Yield of crude product, 9.0 parts (73.2 percent). The product for analysis, of formula (26)

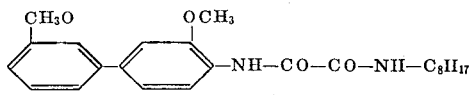

$H_{17}C_8NH-CO-CO-HN-$ which has been twice recrystallized from dimethylformamide-methanol, shows the following data:
Melting point 189° to 190°C.

Analysis:
  Calculated: C 66.86 H 8.25 N 9.17
  Found: C 66.79 H 7.95 N 9.47

The compounds listed in the following Tables were manufactured in the same manner or an analogous manner. In the Tables, the columns denote the following: Column I: formula No.; column II: structural formula or partial formula; column III: melting point (uncorrected), °C; column IV: analytical data C, H and N (1st. line, calculated; 2nd line, found). The mark "*" after the melting point in column III denotes "melting with decomposition."

(27)

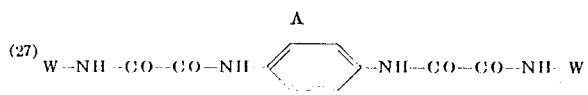

| I | II: W= | III | IV | | |
|---|---|---|---|---|---|
| 28 | –⟨phenyl⟩ | >300 | 65.66 | 4.51 | 13.92 |
| | | | 65.91 | 4.75 | 13.82 |
| 29 | $C_8H_{17}O$–⟨phenyl⟩–$C(CH_3)_3$ | 205–206 | 71.65 | 8.63 | 7.27 |
| | | | 71.51 | 8.72 | 7.29 |
| 30 | $C_2H_5O$–⟨phenyl⟩ | 292–293 | 63.66 | 5.34 | 11.42 |
| | | | 63.72 | 5.39 | 11.29 |
| 31 | $CH_3$–⟨phenyl⟩–$CH_3$ | >300 | 68.10 | 5.72 | 12.22 |
| | | | 67.75 | 5.85 | 12.48 |
| 32 | –$(CH_2)_3$–N⟨morpholine⟩ | 261–262 | 57.13 | 7.19 | 16.66 |
| | | | 56.82 | 7.06 | 16.89 |
| 33 | –$CH_2$–⟨phenyl⟩ | 359–360 | 66.96 | 5.15 | 13.02 |
| | | | 67.06 | 5.06 | 13.20 |
| 34 | –$C_2H_5$ | >360 | 54.89 | 5.92 | 18.29 |
| | | | 54.87 | 5.88 | 18.13 |
| 35 | –$C_8H_{17}$ | 300–301 | 65.79 | 8.92 | 11.81 |
| | | | 65.99 | 8.84 | 11.76 |
| 36 | –$C_{18}H_{37}$ | 266–267 | 73.16 | 10.95 | 7.42 |
| | | | 73.08 | 10.82 | 7.54 |
| 37 | –$CH_2CH_2OH$ | 329–330 | 49.70 | 5.36 | 16.56 |
| | | | 49.51 | 5.30 | 16.88 |
| 38 | –$CH_2\overset{CH_3}{C}=CH_2$ | 322–323 | 60.32 | 6.19 | 15.63 |
| | | | 60.19 | 6.05 | 15.49 |
| 39 | –$(CH_2)_3$–N$(CH_3)_2$ | 304–305 | 57.12 | 7.67 | 19.99 |
| | | | 56.94 | 7.48 | 19.70 |
| 40 | –$CH_2CH(C_2H_5)(C_4H_9)$ | 295–296 | 65.79 | 8.92 | 11.81 |
| | | | 66.000 | 8.81 | 11.62 |

(41)

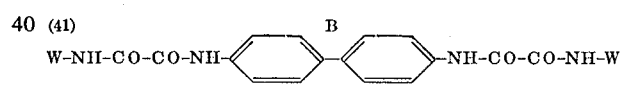

| I | II: W= | III | IV | | |
|---|---|---|---|---|---|
| 42 | –$C_2H_5$ | >360 | 62.81 | 5.80 | 14.65 |
| | | | 62.78 | 5.80 | 14.50 |
| 43 | –$CH_2\overset{CH_3}{C}=CH_2$ | *353 | 66.34 | 6.03 | 12.90 |
| | | | 66.06 | 6.16 | 12.83 |
| 44 | –$CH_2CH_2CH_2N(CH_3)_2$ | 341–342 | 62.88 | 7.31 | 16.92 |
| | | | 62.92 | 7.34 | 16.71 |
| 45 | –$CH_2CH(C_2H_5)(C_4H_9)$ | 297–298 | 70.04 | 8.08 | 10.21 |
| | | | 69.69 | 8.28 | 10.11 |
| 46 | –$CH_2CH_2CH_2$–N⟨morpholine⟩ | 304–305 | 62.05 | 6.94 | 14.47 |
| | | | 62.09 | 6.89 | 14.46 |
| 47 | –$CH_2$–⟨phenyl⟩ | >360 | 71.13 | 5.17 | 11.06 |
| | | | 71.02 | 5.15 | 10.76 |
| 48 | $CH_3$–⟨phenyl⟩–$CH_3$ | >300 | 71.89 | 5.66 | 10.48 |
| | | | 71.56 | 5.66 | 10.50 |
| 49 | $OC_8H_{17}$–⟨phenyl⟩–$C(CH_3)_3$ | 220–221 | 73.73 | 8.33 | 6.61 |
| | | | 73.71 | 8.26 | 6.70 |

(51)

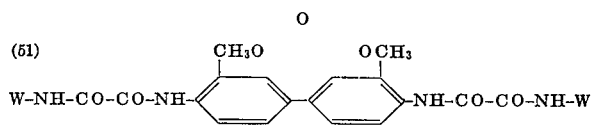

W-NH-CO-CO-NH-[aryl with CH₃O]-[aryl with OCH₃]-NH-CO-CO-NH-W

| I | II: W= | III | IV | | |
|---|---|---|---|---|---|
| 50 | -C(CH₂OH)₃ | 244-245 | 53.93 | 5.66 | 10.48 |
| | | | 53.87 | 5.79 | 10.47 |
| 52 | -C(CH₂OH)₃ | 229-231 | 52.52 | 5.76 | 9.42 |
| | | | 52.24 | 5.61 | 9.27 |
| 53 | phenyl | 315-317 | 66.90 | 4.87 | 10.40 |
| | | | 66.71 | 4.81 | 10.32 |
| 54 | 2,4-dimethylphenyl | 268-270 | 68.67 | 5.76 | 9.42 |
| | | | 68.79 | 5.80 | 9.30 |
| 55 | 4-OC₈H₁₇, 2-C(CH₃)₃ phenyl | 232-233 | 71.49 | 8.22 | 6.18 |
| | | | 71.32 | 7.97 | 6.22 |
| 56 | 2-C₂H₅O phenyl | 257-258 | 65.16 | 5.47 | 8.94 |
| | | | 65.12 | 5.49 | 8.97 |
| 57 | -C₂H₅ | 300-302 | 59.72 | 5.92 | 12.66 |
| | | | 59.46 | 5.86 | 12.58 |
| 58 | -C₁₈H₃₇ | 176-177 | 72.77 | 10.18 | 6.29 |
| | | | 72.64 | 9.91 | 6.35 |
| 59 | -CH₂-C(CH₃)=CH₂ | 262-263 | 63.14 | 6.11 | 11.33 |
| | | | 63.03 | 5.87 | 11.24 |
| 60 | -CH₂-CH-CH₂-N(CH₃)₂ | 195-196 | 60.41 | 7.24 | 15.10 |
| | | | 60.61 | 7.37 | 15.27 |
| 61 | -CH₂-CH(C₄H₉)(C₂H₅) | 205-206 | 66.86 | 8.25 | 9.17 |
| | | | 67.08 | 8.09 | 9.21 |
| 62 | 2-HO, 5-C(CH₃)₃ phenyl | 305-306 | 66.84 | 6.20 | 8.21 |
| | | | 66.59 | 6.22 | 8.26 |
| 63 | 2-C₂H₅O, 5-OC₂H₅ phenyl | 300-302 | 63.85 | 5.92 | 7.84 |
| | | | 63.68 | 5.76 | 7.61 |
| 64 | -CH₃ | 317-318 | 57.96 | 5.35 | 13.52 |
| | | | 57.75 | 5.47 | 13.40 |
| 65 | -CH₂CH₂OH | *295 | 55.69 | 5.52 | 11.81 |
| | | | 55.69 | 5.39 | 12.01 |
| 66 | -NH₂ | >350 | 51.92 | 4.84 | 20.18 |
| | | | 51.90 | 4.98 | 19.96 |
| 67 | -CH₂CH₂CH₂-N(morpholino) | 217-219 | 59.98 | 6.92 | 13.12 |
| | | | 59.87 | 6.82 | 12.97 |
| 68 | -CH₂-phenyl | 298-300 | 67.83 | 5.34 | 9.89 |
| | | | 67.65 | 5.62 | 10.10 |

D

(69) W-NH-CO-CO-NH-[aryl-CH₃]-[aryl-CH₃]-NH-CO-CO-NH-W

| I | II: W= | III | IV | | |
|---|---|---|---|---|---|
| 70 | -C₈H₁₇ | 231-232 | 70.55 | 8.71 | 9.68 |
| | | | 70.26 | 8.51 | 9.61 |
| 71 | -C₁₈H₃₇ | 201-202 | 75.48 | 10.56 | 6.52 |
| | | | 75.32 | 10.27 | 6.49 |
| 72 | -CH₂CH₂OH | 283-284 | 59.72 | 5.92 | 12.66 |
| | | | 59.56 | 6.20 | 12.55 |
| 73 | -CH₂-C(CH₃)=CH₂ | 263-264 | 67.51 | 6.54 | 12.11 |
| | | | 67.60 | 6.48 | 12.00 |
| 74 | -(CH₂)₃-N(CH₃)₂ | 231-232 | 64.10 | 7.69 | 16.02 |
| | | | 64.06 | 7.59 | 15.84 |
| 75 | -(CH₂)₃-N(morpholino) | 188-189 | 63.14 | 7.29 | 13.81 |
| | | | 63.30 | 7.22 | 13.76 |
| 76 | -CH₂-CH(C₂H₅)(C₄H₉) | 192-193 | 70.55 | 8.71 | 9.68 |
| | | | 70.38 | 8.73 | 9.64 |
| 77 | -CH₂-phenyl | 284-285 | 71.89 | 5.66 | 10.48 |
| | | | 71.71 | 5.69 | 10.41 |
| 78 | -C₂H₅ | 295-296 | 64.37 | 6.39 | 13.65 |
| | | | 64.20 | 6.32 | 13.67 |

E

| I | II | III | IV | | |
|---|---|---|---|---|---|
| 79 | phenyl-NH-CO-CO-NH-[C₆H₄]-C(CH₃)₂-[C₆H₄]-NH-CO-CO-NH-phenyl | 291-293 | 71.52 | 5.42 | 10.76 |
| | | | 71.83 | 5.47 | 10.71 |
| 80 | C₈H₁₇NHCOCONH-[C₆H₄]-C(CH₃)₂-[C₆H₄]-NHCOCONHC₈H₁₇ | 161-162 | 70.90 | 8.84 | 9.45 |
| | | | 70.98 | 8.82 | 9.38 |
| 81 | (2-C₂H₅O-phenyl)-NHCOCONH-[C₆H₄]-CH₂-[C₆H₄]-NHCOCONH-(2-OC₂H₅-phenyl) | >300 | 68.26 | 5.56 | 9.65 |
| | | | 68.07 | 5.45 | 9.81 |

E—Continued

| I | II | III | IV | | |
|---|---|---|---|---|---|
| 82 | C₂H₅NHCOCONH—⟨phenyl⟩—CH₂—⟨phenyl⟩—NHCOCONHC₂H₅ | 304–305 | 63.62<br>63.90 | 6.10<br>6.01 | 14.13<br>13.99 |
| 83 | C₁₈H₃₇NHCOCONH—⟨phenyl(CH₃)⟩—CH₂—⟨phenyl(CH₃)⟩—NHCOCONHC₁₈H₃₇ | 173–175 | 75.64<br>75.51 | 10.62<br>10.61 | 6.42<br>6.43 |
| 84 | ⟨phenyl⟩—NH—CO—CO—NH—⟨phenyl⟩—SO₂—⟨phenyl⟩—NH—CO—CO—NH—⟨phenyl⟩ | >350 | 61.98<br>61.42 | 4.09<br>3.99 | 10.33<br>10.24 |
| 85 | (bis-phenyl ether with NH–CO–CO–NH–C₈H₁₇(n) groups) | 259–260 | 67.80<br>67.85 | 8.19<br>8.08 | 9.87<br>9.81 |
| 86 | (tris-phenyl NH bridged with NH—COCO—NH—CH₂—CH(C₂H₅)—(CH₂)₃—CH₃ groups) | 181–183 | 67.93<br>68.22 | 9.37<br>8.53 | 12.38<br>12.42 |
| 87 | (bis-phenyl sulfide with NH—COCO—NH—CH₂—CH(C₂H₅)—(CH₂)₃—CH₃ groups) | 188–190 | 65.94<br>65.88 | 7.96<br>7.92 | 9.62<br>9.53 |

F (88)

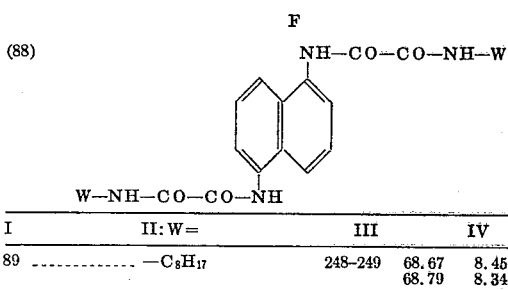

| I | II: W= | III | IV | | |
|---|---|---|---|---|---|
| 89 | —C₈H₁₇ | 248–249 | 68.67<br>68.79 | 8.45<br>8.34 | 10.68<br>10.64 |

F—Continued

| I | II: W= | III | IV | | |
|---|---|---|---|---|---|
| 90 | —(CH₂)₃N(CH₃)₂ | 269–270 | 61.25<br>61.31 | 7.28<br>7.25 | 17.86<br>18.03 |
| 91 | —CH₂CH₂OH | 297–298 | 55.66<br>55.54 | 5.19<br>5.22 | 14.43<br>14.26 |
| 92 | —CH₂C(CH₃)=CH₂ | 310–311 | 64.69<br>64.70 | 5.92<br>5.91 | 13.72<br>13.63 |

G

| I | II | III | IV | | |
|---|---|---|---|---|---|
| 93 | -NHCOCONHCH₂CH(C₂H₅)(C₄H₉) ; (on ring with CH₃) -NHCOCONHCH₂CH(C₂H₅)(C₄H₉) | 114–115 | 66.36<br>66.29 | 9.08<br>9.21 | 11.47<br>11.23 |
| 94 | C₈H₁₇NHCOCONH–[2,5-Cl₂-C₆H₂]–NHCOCONHC₈H₁₇ | 209–210 | 57.45<br>57.75 | 7.52<br>7.56 | 10.31<br>10.27 |
| 95 | (CH₃)₂N(CH₂)₃NHCOCONH–[2,5-Cl₂-C₆H₂]–NHCOCONH(CH₂)₃N(CH₃)₂ | 229–230 | 49.08<br>49.01 | 6.18<br>6.13 | 17.17<br>17.30 |
| 96 | C₈H₁₇NHCOCONH–[2-Cl-5-CH₃-C₆H₂]–NHCOCONHC₈H₁₇ | 223–224 | 61.99<br>62.24 | 8.29<br>8.27 | 10.71<br>10.45 |
| 97 | (C₂H₅)(C₄H₉)CHCH₂NHCOCONH–[2-Cl-5-CH₃-C₆H₂]–NHCOCONHCH₂CH(C₂H₅)(C₄H₉) | 197–198 | 61.99<br>62.10 | 8.29<br>8.31 | 10.71<br>10.44 |
| 98 | C₈H₁₇NHCOCONH–[2,5-(CH₃)₂-C₆H₂]–NHCOCONHC₈H₁₇ | 242–243 | 66.90<br>66.75 | 9.22<br>9.41 | 11.15<br>11.17 |
| 99 | (C₂H₅)(C₄H₉)CHCH₂NHCOCONH–[2,5-(CH₃)₂-C₆H₂]–NHCOCONHCH₂CH(C₂H₅)(C₄H₉) | 216–217 | 66.90<br>66.90 | 9.22<br>9.29 | 11.15<br>11.25 |
| 100 | C₆H₅CH₂NHCOCONH–[2,5-(CH₃)₂-C₆H₂]–NHCOCONHCH₂C₆H₅ | 322–324 | 68.10<br>67.96 | 5.72<br>5.71 | 12.22<br>12.32 |
| 101 | C₈H₁₇NHCOCONH–C₆H₄–NHCOCONHC₈H₁₇ | 253–254 | 65.79<br>65.67 | 8.92<br>8.87 | 11.81<br>11.61 |
| 102 | (n)H₁₇C₈–NH–COCO–NH–[C₆H₃-OCH₃]–NH–COCO–NH–C₈H₁₇ | 143–145 | 64.26<br>64.56 | 8.79<br>8.71 | 11.10<br>11.00 |

H

| I | II | III | IV | | |
|---|---|---|---|---|---|
| 103 | [–CH₂–NH–CO–CO–NH–C₆H₄–OC₂H₅]₂ | >300 | 59.72<br>59.70 | 5.92<br>5.92 | 12.66<br>12.87 |
| 104 | [–(CH₂)₆–NH–CO–CO–NH–C₆H₄–OC₂H₅]₂ | 231–233 | 65.95<br>66.00 | 7.96<br>7.92 | 9.62<br>9.70 |
| 105 | C₆H₅–NH–CO–CO–NH–CH(CH₃)–CH₂–NH–CO–CO–NH–C₆H₅ | 296–297 | 61.94<br>61.69 | 5.47<br>5.30 | 15.21<br>15.23 |

II—Continued

| I | II | III | IV | | |
|---|---|---|---|---|---|
| 106 | ethoxyphenyl-NH-COCO-NH-CH(CH₃)-CH₂-NH-COCO-NH-ethoxyphenyl $$\text{EtO-C}_6\text{H}_4\text{-NH-COCO-NH-CH(CH}_3\text{)-CH}_2\text{-NH-COCO-NH-C}_6\text{H}_4\text{-OEt}$$ | 197–198 | 60.51<br>60.78 | 6.18<br>6.27 | 12.27<br>12.34 |
| 107 | $$\text{C}_8\text{H}_{17}\text{O-(t-Bu)C}_6\text{H}_3\text{-NH-COCO-NH-CH(CH}_3\text{)-CH}_2\text{-NH-COCO-NH-C}_6\text{H}_3\text{(t-Bu)-OC}_8\text{H}_{17}$$ | 147–148 | 70.07<br>70.15 | 9.30<br>9.49 | 7.60<br>7.65 |
| 108 | $$\text{H}_3\text{C-C(CH}_3\text{)(CH}_2\text{-)-CH}_2\text{-NH-COCO-NH-C}_6\text{H}_4\text{-OC}_2\text{H}_5$$<br>$$\text{HC(CH}_3\text{)-CH}_2\text{CH}_2\text{-NH-COCO-NH-C}_6\text{H}_4\text{-OC}_2\text{H}_5$$ | 206–211 | 64.42<br>64.38 | 7.46<br>7.20 | 10.36<br>10.23 |

| I | II | III | IV | | |
|---|---|---|---|---|---|
| 109 | NH–COCO–NH–C₆H₄(OCH₃)<br>CH₂<br>CH₂<br>NH<br>CH₂<br>CH₂<br>NH–COCO–NH–C₆H₄(OCH₃) | 159–160 | 57.76<br>57.74 | 5.95<br>5.96 | 15.31<br>15.10 |
| 110 | $$[\text{H}_5\text{C}_2\text{O-C}_6\text{H}_4\text{-NH-COCO-NH-(CH}_2\text{)}_3\text{-]}_2\text{NH}$$ | 229–230 | 60.80<br>60.98 | 6.87<br>7.05 | 13.64<br>13.56 |
| 111 | $$[\text{H}_5\text{C}_2\text{O-C}_6\text{H}_4\text{-NH-COCO-NH-(CH}_2\text{)}_3\text{-]}_2\text{N-CH}_3$$ | 220–221 | 61.46<br>61.44 | 7.07<br>7.03 | 13.27<br>13.29 |
| 112 | $$\text{C}_6\text{H}_5\text{-NH-CO-CO-NH-(CH}_2\text{)}_3\text{-NH-(CH}_2\text{)}_3\text{-NH-CO-CO-NH-C}_6\text{H}_5$$ | 204–205 | 62.10<br>62.26 | 6.40<br>6.35 | 16.46<br>16.42 |

USE EXAMPLES

In the use examples which follow, typical representatives of particular subgroup of compounds according to the invention were used in each case. In principle, all the compounds mentioned in the preceding description, as well as their equivalents, are suitable in the same way, with merely the solubility of the compound in question in the substrate to be used having to be taken into account or having to be determined by a small scale experiment.

EXAMPLE 4

An acetylcellulose of about 50 μ thickness was manufactured by casting a 10 % strength solution of acetylcellulose in acetone, containing 1 percent (calculated relative to acetylcellulose) of the compound according to formula (79). After drying the following values were obtained for the percentage light transmission:

| Wavelength in mμ | Light transmission in % | |
|---|---|---|
| | not exposed to light | exposed to light (100 hours in a fadeometer) |
| 280 to 320 | 5 | 7 |
| 330 | 9 | 11 |
| 340 | 20 | 21 |
| 350 | 37 | 38 |
| 360 | 59 | 59 |
| 370 | 75 | 75 |

Analogous behavior is for example shown by the compounds of formulas (23), (60) and (105).

EXAMPLE 5

A paste of 100 parts of polyvinyl chloride, 59 parts by volume of dioctyl phthalate and 0.1 part of the compound of formula (26) is rolled into a film of about 0.5 mm thickness on a calendar at 145° to 150°C. The polyvinyl chloride film thus obtained absorbs completely in the ultraviolet range form 280 to 340 mµ.

Instead of the compound of formula (26) it is for example also possible to use one of the compounds of formulas (36), (42), (58), (67), (70), (71), (75), (76), (80), (83), (86), (87), (89), (93), (94), (96), (97), (98), (99), (101), (102), (106) to (111).

EXAMPLE 6

A mixture of 100 parts of polyethylene and 0.2 parts of the compound of formula (23) is rolled into a film on a calendar at 130° to 140°C and is pressed at 150°C.

The polyethylene film thus obtained is practically opaque to ultraviolet light in the region from 280 to 330mµ.

Instead of the compound of formula (23) it is for example also possible to use one of the compounds of formulas (33), (39), (55), (57), (58), (59), (79), (83), (89), (90), (91), (92), (94), (95), (96), (98), (101), (104), (106), (110) or (111).

EXAMPLE 7

A mixture of 100 parts of polypropylene and 0.2 part of one of the compounds of formulas (36), (71), (83), (87), (93), (101) or (107) is processed into a hide on a calender at 170°C. This hide is pressed into a 1 mm thick sheet at 230° to 240°C and a maximum pressure of 40 kg/cm².

The sheets thus obtained are opaque to ultraviolet light in the region from 280 to 340 mµ. Similar behavior is also shown by other compounds listed in the Table.

We claim:

1. A bis-oxalic acid diamide of the formula $A_2$—NH—CO—CO—NH—$B_2$—NH—CO—CO—NH—$A_2$ wherein $A_2$ each represents:
  a. a phenyl or phenyl substituted by one to two alkyl groups with one to six carbon atoms or alkoxy groups with one to eight carbon atoms;
  b. a 2-methallyl group;
  c. an alkyl group with one to 18 carbon atoms;
  d. a dialkylamino-alkyl group with up to eight carbon atoms for each alkyl;
  e. a morpholino alkyl (1–4 C) group;
  f. a phenyl-alkyl (1–4 C) group; or
  g. an amino group, and $B_2$ represents
  a. an alkylene group with one to 12 carbon atoms,
  b. an alkylene group with one to 12 carbon atoms interrupted by one —NH— or —N(alkyl)— group having one to four carbon atoms in the alkyl part, or
  c. phenylene or phenylene substituted by one to two chloro atoms, alkyl or alkoxy groups each with one to four carbon atoms,
  d. naphthylene,
  e. diphenylene or diphenylene substituted by one to two alkyl or alkoxy groups containing one to four carbon atoms, or
  f.

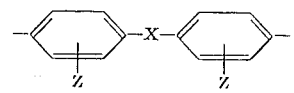

wherein Z denotes hydrogen or an alkyl group containing one to four carbon atoms and X represents methylene or methylene substituted by one to two alkyl groups having a total of up to three carbon atoms or a bridge member —O—, —S—, —NH— or —SO₂—, and wherein at least one of the groups $A_2$ and $B_2$ must contain a benzene ring which is directly bonded to a —NH— group according to the above formula.

2. A bis-oxalic acid diamide of the formula according to claim 2 wherein $A_2$ each represents a phenyl group or a phenyl group substituted by one to two alkyl groups with one to six carbon atoms or alkoxy groups with one to eight carbon atoms and $B_2$ represents an alkylene group having one to 12 carbon atoms interrupted by one —NH— or —N(alkyl)- group with one to four carbon atoms in the alkyl part.

3. A bis-oxalic acid diamide of the formula according to claim 2 wherein $B_2$ represents (a) phenylene or phenylene substituted by one to two chloro atoms, alkyl or alkoxy groups with one to four carbon atoms each, (b) naphthylene, (c) diphenylene or diphenylene substituted by one to two alkyl or alkoxy groups containing one to four carbon atoms, or (d)

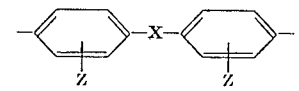

wherein Z denotes hydrogen or an alkyl group containing one to four carbon atoms, and X represents methylene or methylene substituted by one to two alkyl groups having a total of up to three carbon atoms or a bridge member —O—, —S—, —NH— or —SO₂—, and $A_2$ represents a 2-methallyl group, an alkyl group having one to 18 carbon atoms, a dialkylaminoalkyl group with up to eight carbon atoms for each alkyl, a morpholino-alkyl (1–4 C) group, a phenyl-alkyl (1–4 C) group or an amino group.

4. A bis-oxalic acid diamide according to claim 2 of formula

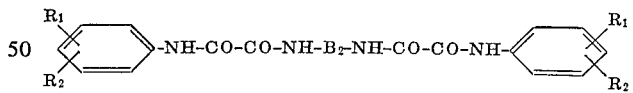

wherein $B_2$ represents a group

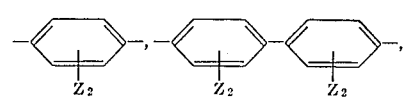

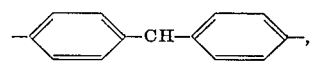

or

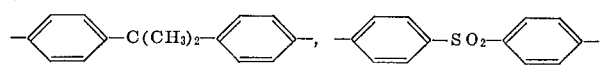

with $Z_2$ representing hydrogen, methyl or methoxy and $R_1$ and $R_2$ denoting a hydrogen atom, an alkoxy group containing one to eight carbon atoms or an alkyl group containing one to six carbon atoms.

5. A bis-oxalic acid diamide according to claim 2 of formula

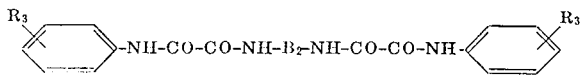

wherein $B_2$ represents an alkylene group having one to 12 carbon atoms or an alkylene group having one to 12 carbon atoms interrupted by one —NH— or —N(alkyl)- group with one to four carbon atoms in the alkyl part, and $R_3$ denotes a hydrogen atom, an alkoxy group containing one to eight carbon atoms or an alkyl group containing one to six carbon atoms.

6. A bis-oxalic acid diamide according to claim 2 of formula

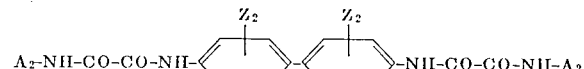

wherein $Z_2$ denotes a hydrogen atom, a methyl or methoxy group and $A_2$ denotes an alkyl group containing one to 18 carbon atoms, a 2-methallyl group, an aralkyl group containing a benzene radical and an alkyl part containing one to four carbon atoms, a dialkylaminoalkyl group with up to 8 carbon atoms for each alkyl or a morpholino-alkyl (1–4 C) group.

7. A bis-oxalic acid diamide according to claim 1 of formula

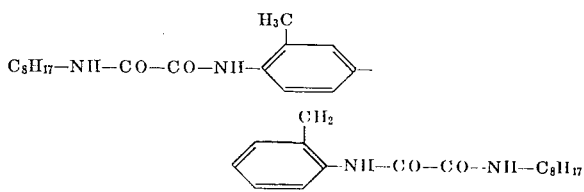

8. A bis-oxalic acid diamide according to claim 1 of formula

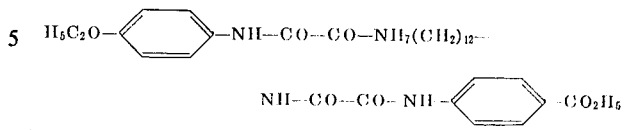

9. A bis-oxalic acid diamide according to claim 1 of formula

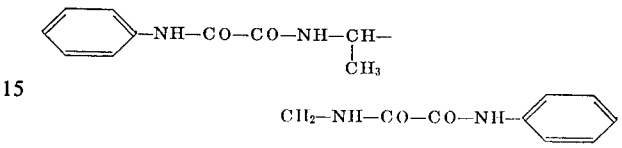

10. A bis-oxalic acid diamide according to claim 1 of formula

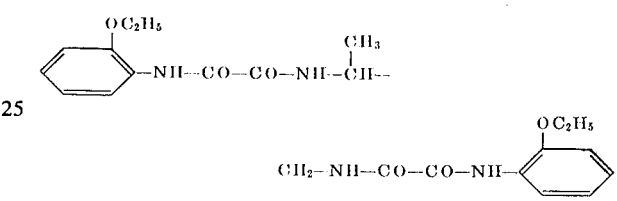

11. A bis-oxalic acid diamide according to claim 1 of formula

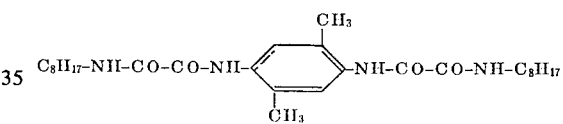

12. A bis-oxalic acid diamide according to claim 1 of formula

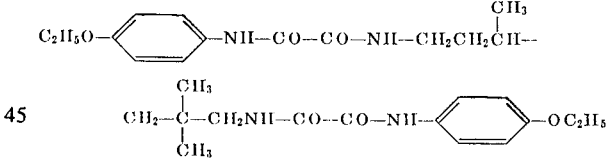

* * * * *

PO-1050
(5/69)

UNITED STATES PATENT OFFICE
CERTIFICATE OF CORRECTION

Patent No. 3,683,020      Dated August 8, 1972

Inventor(s) CHRISTIAN LUETHI ET AL

It is certified that error appears in the above-identified patent and that said Letters Patent are hereby corrected as shown below:

Column 1, under "[73]" after "AG" insert --- , Basel, Switzerland ---.

Column 24, claims 2 and 3, line 2 in each, delete "2" and substitute --- 1 ---.

Column 24, claim 4, line 1, delete "2" and substitute --- 1 ---.

Column 25, claims 5 and 6, line 1 in each, delete "2" and substitute --- 1 ---.

Column 25, line 45, delete "$\overset{|}{C}H_2$" and substitute --- $\overset{|}{C}H_3$ ---.

Column 26, line 5, delete "$-NH_7(CH_2)_{12}-$" and substitute --- $-NH-(CH_2)_{12}-$ ---.

Signed and sealed this 30th day of April 1974.

(SEAL)
Attest:

EDWARD M.FLETCHER,JR.
Attesting Officer

C. MARSHALL DANN
Commissioner of Patents